CARRIER SYSTEM SPLASH RING SIGNAL
Filed May 24, 1952
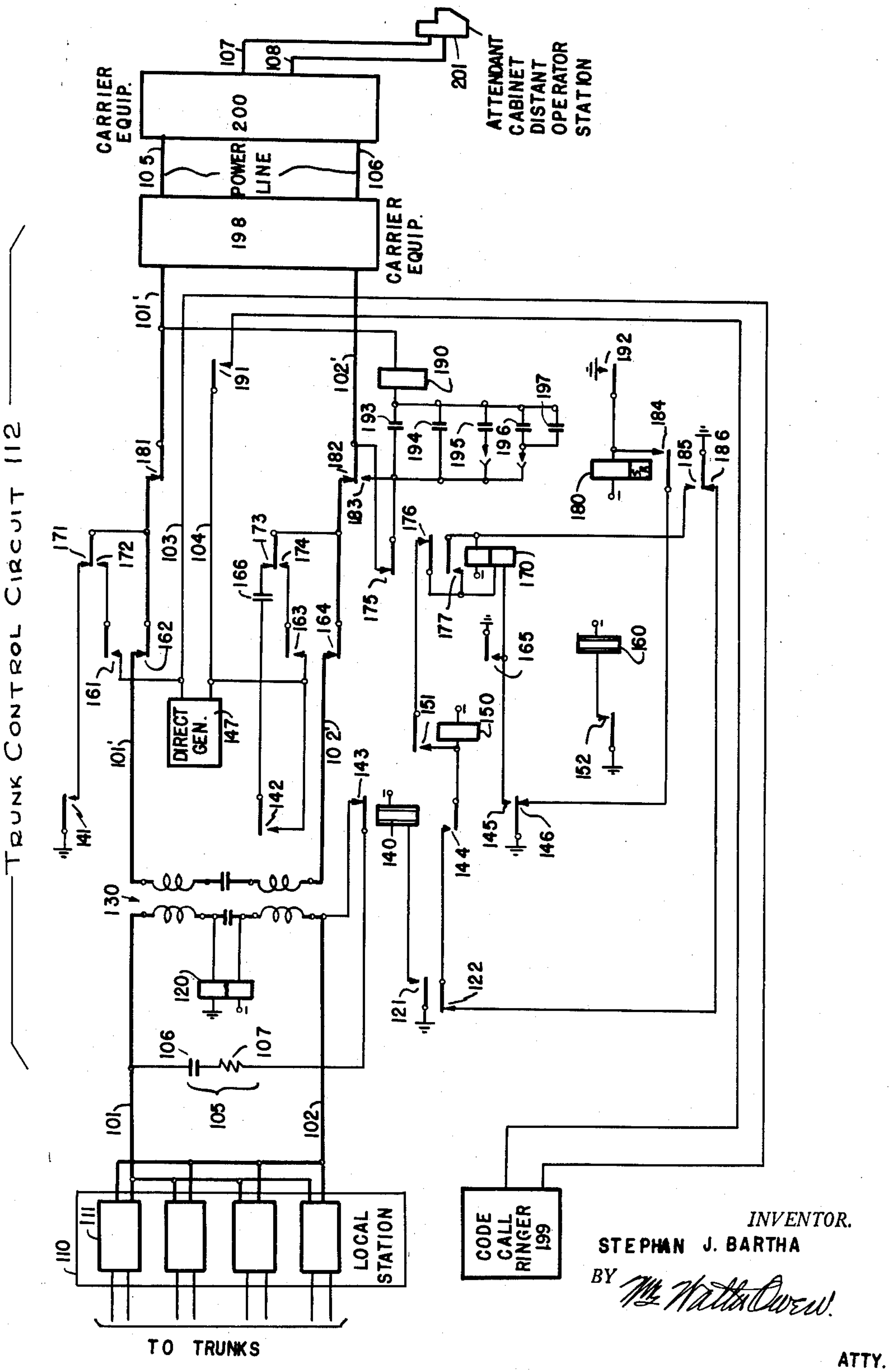
INVENTOR.
STEPHAN J. BARTHA
BY *[signature]*
ATTY.

United States Patent Office 2,735,898

Patented Feb. 21, 1956

2,735,898

CARRIER SYSTEM SPLASH RING SIGNAL

Stephan J. Bartha, Lombard, Ill., assignor to Automatic Electric Laboratories, Inc., Chicago, Ill., a corporation of Delaware Application May 24, 1952, Serial No. 289,821

17 Claims. (Cl. 179—84)

The present invention relates to electrical signalling systems and is more particularly concerned with systems employing carrier currents for transmitting speech and signal currents between a plurality of local telephone subscribers and a distant operator station.

This signalling system was designed for calls between a local telephone station and a distant operator station via power line carrier telephone. A momentary, "splash," signal is utilized to inform the distant operator of the local subscriber's desire to make a call over the carrier system. Similarly a "splash" signal is transmitted to the distant operator whenever the local subscriber hangs up upon termination of the call. The aim of the invention is to present a method of signalling the distant operator without the use of complicated and expensive devices used in conjunction with the continuous ringing method.

The object of the invention is to provide a trunk control circuit with associated components for momentarily signalling the distant operator station from a local telephone station.

Another object is to provide similar "splash" signalling whenever the local subscriber hangs up upon termination of the call to thereby inform the operator at the distant operator station that the line is free.

A further object is to remove the dial tone from the trunk control circuit seized by an incoming call and keep it inoperative thereafter until the call is established or until the circuit is released.

A further object of the invention is to clear or release the trunk control circuit after an incoming call remained unanswered, by removing (no dial tone) and then replacing the receiver to thereby "splash" ring the operator that the line has been cleared.

Another object consists in providing a proper local termination for the carrier at the local station whenever the receiver is replaced on the hook thereby preventing oscillation instability of the carrier due to load removal.

A particular embodiment of the invention will be described with reference to the accompanying drawing which illustrates the local station 110, the trunk control circuit 112, the carrier equipment 198 and 200, and the distant operator station 201. The local station has a series of telephones which have individual facilities for switching either to outgoing trunks or to the carrier system. Line termination pad 105 approximates the impedance of any one of the telephones at the local station 110, such as telephone 111 and functions to present a proper load to the carrier equipment 198 whenever any one of the telephones at the local station 110 is disconnected from the talk circuit by replacing the receiver on the hook. The repeating coil 130 allows the transmitted voice currents to pass through to the local telephone at the same time isolating the telephone from the carrier equipment 198. The ringing relay 190 and the series-parallel network of capacitors connected thereto form a resonant circuit which is highly responsive to receipt of a particular frequency, the ringing frequency, consisting in present application of 60 cycles per second. The code call ringer 199 is operated by the ringing relay 190 in response to a coded signal transmitted from the distant station 201. Each telephone at the local station 110 has its individual code call.

Upon lifting of the receiver of telephone 111, the trunk control circuit 112 is ready for dialling if there is a presence of dial tone on the line. Dialling a particular digit, for instance the digit "0," closes a series of relays in the trunk control circuit 112 including the signal relay 160 which applies a ringing current from the direct generator 147 to the carrier system. This application of ringing current is only momentary, usually termed a "splash" signal, and lasts for a period approximately equal to the pulsing time plus the time required for the final release of the signal relay 160.

Whenever a call has been completed and the receiver at the local station 111 has been replaced, the control relay 150 is momentarily energized for a period equal to the release time of the slow-to-release loading relay 140. Thereafter, the signal relay 160 becomes energized and applies a "splash" of ringing current to the distant station 201 for an interval equal to the combined release time of the relays 140, 150, and 160.

If an incoming call is made from the distant station 201, a coded signal, composed of a current of a certain frequency, operates the ringing relay 190, which in turn operates the code call ringer 199 to signal the particular local subscriber desired. Immediately after the ringing relay 190 operates, the ring cut-off relay 180 becomes energized and prevents further application of the ringing current to the carrier end of the repeating coil 130. Dial tone cut off relay 170 also becomes operated and disconnects a partially completed path for dial tone from the lines 101′ and 102′. If the called subscriber answers, the call is completed. Upon termination of the call, a "splash" ring will inform the operator thereof. Should the subscriber fail to answer, the operator will abandon the call but the trunk control circuit 112 will remain inoperative to any subsequently attempted calls from the local station 110. After picking up the telephone and finding no dial tone on the line, the subscriber will hang up, thereby releasing the trunk control circuit 112 and its associated relays 170 and 180 and applying a "splash" signal to the operator signifying that the abandoned line has been cleared by the subscriber. Thereafter, a call can be initiated from the local station.

To understand fully the operations involved in the signaling system, a detailed description thereof is hereafter presented.

*Operation in outgoing calls*

*Seizure.*—The trunk control circuit 112 is seized when a receiver is removed from one of the telephones located at the local station 110, such as a telephone 111, and the circuit to the pulsing relay 120 is completed over the following path: ground through the upper winding on relay 120, through the repeating coil 130, over line 101, through the telephone 111, over line 102, through the repeating coil 130, and through the lower winding of relay 120 to battery. Relay 120 operates and closes the circuit to the loading relay 140 when the make contacts 121 close on relay 120. The break contacts 122 on relay 120 open one point in an incomplete circuit to the control relay 150. Relay 140 operates and removes line termination pad 105, comprising a condenser 106 and a resistor 107, from the line end of the repeating coil 130 when the break contacts 143 open. The make contacts 144 prepare a circuit to relay 150; and the make contacts 145 prepare a circuit to the dial tone cut-off relay 170. The make contacts 141 and 142 on relay 140 complete a circuit for dial tone from the DIR. GEN. 147 over the line 104, contacts 142 through the small condenser 166, through the break contacts 173 on relay 170, through the break contacts 164 on relay 160, through the carrier end of repeating coil 130, through the break contacts 162 on relay 160, through the break contacts 171 on relay 170, to ground at the make contacts 141 on relay 140.

*Signalling the operator.*—On receiving dial tone (direct generator), the calling party dials "0," as customary, to reach the distant operator located at station 201. Relay 120 releases and re-operates ten times and interrupts the circuit to relay 140. Relay 140 is slow to release and remains operated during the train of pulses and maintains, through the make contacts 144, a part of the circuit to relay 150. The circuit to relay 150 will be completed (at each release of relay 120) from battery at relay 150, through the make contacts 144 on relay 140, through the break contacts 122 on relay 120 and through the break contacts 186 on relay 180 to ground. Relay 150 operates and completes the circuit to relay 160 when the make contacts 152 close. The make contacts 151 on relay 150 complete the circuit to relay 170 from the battery at relay 150, through the winding on relay 150, through the make contacts 151, through the break contacts 176 on relay 170, through the lower winding on relay 170, to ground at make contacts 145 on relay 140 and to ground at the make contacts 165 on relay 160 whenever the latter relay becomes operated. Relay 170 locks from battery through the upper winding on relay 170 through the make contacts 177, through the lower winding on relay 170 and to ground at the make contacts 145 on relay 140 or at the make contacts 165 on relay 160 whenever relay 160 becomes operated. Operation of relay 170 causes the break contacts 171 and 173 to open the dial tone circuit connecting to the direct generator 147, and causes the make contacts 172 and 174 to close and prepare a part of the direct generator circuit to the carrier equipment 198. The break contacts 175 open the incomplete circuit to the A. C. relay 190 and the break contacts 176 open a point in the holding circuit for relay 150. The signal relay 160 operates and remains operated for the duration of the pulse train due to its slow-to-release characteristics. Operation of relay 160 causes the break contacts 162 and 164 to open both sides of the circuit from the carrier equipment 198 to the carrier end of the repeating coil 130. Make contacts 161 and 163 close a circuit from direct generator 147 to the carrier equipment 198. The direct generator 147 is connected from its upper lead 103, through the make contacts 161, through the make contacts 172, and through the break contacts 181 over the line 101′ to the carrier equipment 198, and from its lower lead 104, through the make contacts 163, through the make contacts 174, through the break contacts 182, and over the line 102′ to the carrier equipment 198. As a result, a "splash" of ringing current is applied from the direct generator 147 to the carrier equipment 198 which signals the operator located at position 201. Make contacts 165 establish an additional source of ground for relay 170 should relay 140 release. At the completion of the train of pulses relay 120 comes to rest in its energized condition and breaks the circuit from ground at contacts 186 to relay 150 when the break contacts 122 open. Relay 150 releases and opens the circuit to relay 160 when the make contacts 152 open up. Relay 160 releases (after a characteristic delay) and opens the direct generator circuit when the make contacts 161 and 163 open up. The break contacts 162 and 164 restore to complete the connection from the carrier equipment 198 to the carrier end of the repeating coil 130. The distant operator located at position 201 answers and ascertains the number desired and completes the connection.

*Release.*—At the completion of the call, when the calling party hangs up at station 110, the circuit is opened to relay 120. Relay 120 releases and the make contacts 121 open the circuit to relay 140. Break contacts 122 close the circuit to relay 150 thus energizing it. Relay 150 remains operated during the time required for the release of relay 140 and its make contacts 152 complete the ground connection to relay 160. Relay 160 operates and its break contacts 162 and 164 open the circuit to the carrier end of the repeating coil 130. Make contacts 163 and 161 on relay 160 complete the circuit between the direct generator 147 and the carrier equipment 198. A "splash" of ringing current is therefore transmitted over the carrier channel 105 and 106 to signal the distant operator located at station 201 that the local party at station 110 has disconnected. The time interval during which the "splash" current is transmitted will equal, approximately, the time interval between the release of relay 120 and the subsequent release of relays 140, 150 and finally relay 160. Relay 140 releases and its make contacts 144 open the circuit to relay 150. The make contacts 145 open up and remove a multiple ground from relay 170. The break contacts 143 close and restore the line termination pad 105 across the lines 101 and 102. The impedance of the line termination pad 105 approximates the impedance of any one of the telephones at local station 110 and is designed to prevent oscillation (in the amplifier associated with the carrier equipment 198), which might otherwse result from impedance mis-match when a telephone is disconnected at the station 110 upon termination of a call. Relay 150 releases and thereby releases relay 160 when the make contacts 152 open up. The make contacts 163 and 161 on relay 160 open the circuit from the direct generator to the carrier equipment 198. The break contacts 162 and 164 restore the circuit from the carrier equipment 198 to the carrier end of the repeating coil 130. The make contacts 165 remove the locking ground from relay 170. Relay 170 releases and restores the trunk control circuit to normal, ready for another call.

*Operation in incoming calls*

*Seizure and signalling (through code call equipment).*—The operator, located at station 201, desiring to make connections to a subscriber's station at the local station 110 (via carrier equipment 198 and 200) place a 60-cycle current on the leads 101′ and 102′ which will operate the ringing relay 190 through the break contacts 175 and the series-parallel arrangement of condensers 193, 194, 195, 196 and 197. The condenser arrangement together with the coil of relay 190 is designed to provide a circuit strongly resonant to 60-cycle current to provide maximum sensitivity and insure against false operation of relay 190. Operation of relay 190 causes the make contacts 192 to close a circuit to the ring cut-off relay 180; and causes the make contacts 191 to connect the direct generator 147 to the code call ringer 199 under the control of the distant operator. Relay 180 operates and effects a lock circuit from battery through the winding of relay 180, through the make contracts 184 on relay 180, and through the break contracts 146 on relay 140 to ground. The break contacts 181 and 182 open the circuit to the carrier end of the repeating coil 130 to prevent further application of 60-cycle voltage to the repeating coil 130. Make contacts 183 provide an alternate circuit to relay 190 (to replace the circuit broken by subsequent operation of relay 170 and opening of its break contacts 175). The make contacts 185 complete an obvious circuit to relay 170. Relay 170 operates and through its break contacts 175 opens the original circuit to relay 190. The break contacts 171 and 173 open a partial circuit to dial tone to prevent application of dial tone from direct generator 147 when the called party answers the incoming call. Relays 170 and 180 remain operated until the called party answers. The operator may now operate relay 190 a predetermined number of times in accordance with the code of the desired party to signal that party.

*Answering.*—The called party answers the code call and closes the circuit to relay 120 as previously described.

Relay 120 operates causing its make contacts 121 to close the circuit to relay 140. Relay 140 operates and its break contacts 143 remove line termination pad 105 from the lines 101 and 102. The make contacts 145 on relay 140 connect the ground to the lower winding of relay 170 thereby establishing a holding circuit. The break contacts 146 remove the locking ground from relay 180. Relay 180 releases (as soon as the operator stops ringing and thus releases relay 190) but relay 170 remains operated (contacts 185 now open) from ground at the make contacts 145 on relay 140, through the lower winding on relay 170, through the make contacts 177 on relay 170, through the upper winding on relay 170 to battery. Continued operation of relay 170 and its break contacts 173 holds open the dial tone circuit. Non-operation of relay 160 and its make contacts 163 and 161 holds open the direct generator circuit while maintaining the circuit from the carrier equipment 198 to the repeating coil 130 through the break contacts 162 and 164. Conversation can now take place, the voice currents being transmitted by induction through the repeating coil 130 to the subscriber at station 110. Release of the circuit upon termination of the call, will be the same as previously described under "Outgoing calls—Release."

*Release from abandoned incoming calls.*—If the distant operator at station 201, receives no answer to the code call, the call will be abandoned; but the trunk control circuit remains seized. If the local party, at station 110, answers his phone subsequently to such abandonment, the subscriber will find the line silent (no dial tone) because the break contacts 173 are open due to the operated condition of relay 170. Relays 120 and 140 operate as previously described. Relay 180 releases since its operating circuit is broken by the break contacts 146 on relay 140. Relays 150 and 160 do not operate at this time because of the open circuit to relay 150 at the opened break contacts 122 on relay 120. Receiving no dial tone, the subscriber hangs up and opens the circuit to relay 120. Relay 120 releases and through its make contacts 121 opens the circuit to relay 140; and through its break contacts 122 closes the circuit to relay 150. Relay 150 operates and closes the circuit to relay 160 by means of its make contacts 152. Relay 160 operates and by means of its contacts 162 and 164 opens the circuit to the carrier end of the repeating coil 130. The make contacts 163 and 161 close the circuit from the direct generator 147 to the carrier equipment 198. A "splash" of ringing current is therefore transmitted to the operator at station 201 during the operation of relay 160 and gives the operator a signal. The time interval of application of the "splash" ringing approximates the time required for the release of relays 140, 150 and 160. Relay 140 releases. The make contacts 144 on relay 140 open the circuit to relay 150. Relay 150 releases and through its make contacts 152 opens the circuit to relay 160. Relay 160 releases and opens the circuit to relay 170 when the break contacts 165 open up. Relay 170 releases and restores the circuit 112 to normal.

While there has been described what is at present considered to be the preferred embodiment of the invention it will be understood that various modifications may be made therein without departing from the invention, and it is contemplated, therefore, in the appended claims to cover all such modifications as fall within the true spirit and scope of the invention.

What is claimed is:

1. In a carrier current signalling system having a line with means for communicating thereover via carrier currents to an operator's position, and including substations having means for seizing said line and transmitting impulses thereover and for thereafter disconnecting the substation from the line, a balancing network normally connected to said line, means associated with the line for disconnecting said network therefrom, means whereby said last means is operated in response to the seizure of said line, means for transmitting a signal to said operator position, means whereby said last means is operated in response to receipt of impulses transmitted over said line, means for transmitting another signal to said operator position and for reconnecting said network to the line, means whereby said last means is operated responsive to the disconnection of the substation from the line, a code signalling equipment associated with said line, means for operating said signalling equipment to signal one of said substations, means whereby said last means is operated in response to a call over said line from the operator position, other means for indicating to any other substation attempting a call that said line is occupied, and means whereby said last mentioned means is also operated in response to a call over said line from the operator position.

2. In a carrier current signalling system having a line with means for communicating thereover via carrier currents to an operator's position, and including substations having means for seizing said line and transmitting impulses thereover, a balancing network normally connected to said line, means associated with the line for disconnecting said network, means whereby said last means is operated in response to the seizure of said line, means for transmitting a signal to said operator position, means whereby said last means is operated in response to the receipt of impulses transmitted over said line, means for transmitting another signal to said operator position, and means whereby said last means is operated in response to the disconnection of the substation from the line.

3. In the combination as claimed in claim 2, means for releasing said line and for reconnecting said network to the line to prevent deleterious oscillations in said carrier system, and means whereby said last mentioned means is operated in response to the disconnection of the substation from the line.

4. In the combination as claimed in claim 2, a code signalling equipment associated with said line, means for operating said code signalling equipment to signal one of said substations, means whereby said last means is operated in response to a call over said line from the operator position, means for disconnecting said network from the line, means whereby said last means is operated in response to the connection of one of said substations to said line, means for transmitting another signal to said operator position, and means whereby said last means is operated in response to the disconnection of the substation from the line.

5. In the combination as claimed in claim 4, means for releasing the line and for reconnecting said network to said line to prevent unwanted oscillations in the carrier system, and means whereby said last mentioned other means is operated in response to the disconnection of the substation from said line.

6. In a carrier current signalling system having a line with means for communicating thereover via carrier currents to an operator position, and including substations having means for seizing said line, a source of dial tone including means for connection thereof to said line, means for selectively signalling any one of said substations and for disabling said dial tone connecting means, means whereby said last means is operated in response to a call from the operator station, means for holding said line inoperable to the initiation of calls from any of the substations until any one of said substations is connected and subsequently disconnected from said line, and means whereby said last means is effective in response to said call from the operator station.

7. In the combination as claimed in claim 6, means for releasing said line, means whereby said last means is effective in response to connection of any one of said substations to said line, means for releasing said disabling means thereby making said dial tone connecting means operable in response to subsequent connection of any one of said substations to said line, and means whereby said last mentioned means is operated in response to the disconnection of said substation from said line.

8. A carrier wave signalling system comprising a plurality of dial telephone subscribers and a distant operator station, carrier equipment including a circuit terminating in a repeating coil, means for loading the line end of the repeating coil during inactive periods, means for seizing said circuit and removing said loading means, means whereby said last means is operated in response to initiation of a call by one of said subscribers, means for sending a supervisory signal to the distant station, means whereby said last means is effective in response to dialling by said subscriber, means for impressing a momentary signal over the carrier system to said distant station to apprise the operator of the terminated call, and means whereby said last means is effective in response to hanging up by the calling subscriber.

9. In the combination as claimed in claim 8, said seizing means for reinserting of said loading means across the line end of the repeating coil thereby properly terminating the carrier equipment and preventing instability thereof, and means whereby said last mentioned means is released in response to hanging up by the calling subscriber.

10. In the combination as claimed in claim 8, code call equipment connectable to said circuit, means for operating said code call equipment, means whereby said last means is operated in response to initiation of a call from said distant station, seizure means for removing said loading means from said circuit, means whereby said last means is effective in response to a reply by the signalled subscriber, means for applying a momentary signal to said distant station thereby signalling the operator of the idle line upon termination of a call, and means whereby said last means is effective in response to hanging up by the called subscriber.

11. In the combination as claimed in claim 10, said seizure means for releasing said circuit and for reinserting said loading means, and means whereby said last means is released in response to hanging up by the subscriber, thereby properly terminating the carrier to prevent operational instability caused by undesirable oscillations.

12. A carrier wave signalling system comprising a local telephone station, a distant operator station, means including a carrier current circuit for connecting said distant operator station to said local telephone station, code call equipment for signalling the local station, a source of dial tone, frequency responsive means, said frequency responsive means for operating said code call equipment, means whereby said last means is effective in response to the receipt of a coded signal from said distant station, means for rendering said dial tone source ineffective and keeping said circuit operated until released subsequently by operation from the local telephone station, and means whereby said last means is operated in response to actuation of said frequency responsive means.

13. In the combination as claimed in claim 12, means for releasing said circuit to reapply said dial tone and for applying a momentary alerting signal to the distant station thereby informing the operator of the cleared line, and means whereby said last mentioned means is effective in response to hanging up by one of the local subscribers upon noting the absence of dial tone during a subsequent call.

14. In a combination with carrier wave system including a distant station, a plurality of local dial telephone subscribers, a carrier circuit terminating in a trunk control circuit including a repeater coil and loading means, a source of dial tone, pulsing means, a loading relay, means controlled by said pulsing means for actuating said loading relay, means whereby said last means is operated by said pulsating means in response to initiation of a call at one of said local telephones, means controlled by the operation of said loading relay for removing said loading means from said trunk circuit and applying dial tone thereto, a control relay, means controlled by said pulsing means for operating said control relay, means whereby said last means is operated by said pulsing means in response to the receipt of dialled digit pulses, a dial tone cut off relay, a signal relay, means whereby said cut off relay is operated in response to actuation of said control relay to remove dial tone from said trunk, a source of signal current, and means whereby said signal relay is operated in response to the operation of said control relay to momentarily apply a signalling current from said source of signalling current over the carrier system to the distant station thereby requesting the attention of the operator located thereat.

15. In the combination as claimed in claim 14, means whereby said pulsing means is operated in response to hanging up by said calling subscriber to release said loading relay and operate said control relay, said loading relay effective upon release to replace said loading means across the line end of the repeating coil, and means whereby said signal relay is again operated in response to actuation of said control relay to again apply momentarily said ringing current to the distant station thereby informing the operator that the line is free for subsequent calls.

16. In combination with carrier wave system including a distant station, a plurality of local dial telephone subscribers, said carrier system terminating in a trunk control circuit including a repeating coil and a loading means, a source of dial tone, a code call means for signalling the local subscribers, a ring cut off relay, a ringing relay including a resonant circuit, said ringing relay for operating the code call means and the ring cut off relay, means whereby said ringing relay is operated in response to the receipt of a particular frequency signal due to initiation of a call from said distant station, said cut off relay effective in preventing continuous application of said ringing frequency signal to said repeating coil, a dial tone cut off relay for disconnecting the source of dial tone from the trunk preparatory to completion of the call, and means whereby said dial tone cut off relay is operated in response to actuation of said ring cut off relay.

17. In the combination as claimed in claim 16, said ring cut off relay and said dial tone cut off relay remaining operated after an abandoned incompleted call, means for releasing the ring cut off relay, means whereby said last means is operated in response to the operation of the loading relay on a subsequently attempted call from the local telephone, said control and signal relays remaining inoperative during the attempted call, said pulsing means for releasing said loading relay and operating said control relay, means whereby said pulsing means is released in response to hanging up by the subscriber, means whereby said signal relay is operated by said control relay for disconnecting said repeating coil from said trunk and for momentarily applying ringing current to the distant station indicating a release of the formerly abandoned line, said dial tone cut off relay for preparing the dial tone for the next operation of said circuit, and means whereby said last mentioned relay is operated in response to the subsequent release of the signal relay.

References Cited in the file of this patent

UNITED STATES PATENTS 2,535,906 Dillion et al. ----------- Dec. 26, 1950